April 12, 1960  B. R. NICHOLS  2,932,533
BUTTERFLY VALVE SEALING ARRANGEMENT
Filed Nov. 1, 1957  3 Sheets-Sheet 1

Inventor
Beverly R. Nichols
By Howard B. Scheckman
Attorney

April 12, 1960 B. R. NICHOLS 2,932,533
BUTTERFLY VALVE SEALING ARRANGEMENT
Filed Nov. 1, 1957 3 Sheets-Sheet 3

Inventor
Beverly R. Nichols
By Howard B. Scheckman
Attorney

United States Patent Office 2,932,533
Patented Apr. 12, 1960

2,932,533
BUTTERFLY VALVE SEALING ARRANGEMENT

Beverly R. Nichols, Elm Grove, Wis., assignor to Allis-Chalmers Manufacturing Company, Milwaukee, Wis.

Application November 1, 1957, Serial No. 693,965

10 Claims. (Cl. 286—7)

This invention relates to a high pressure butterfly valve and more particularly to a sealing arrangement that prevents leakage around the shaft of the valve.

In butterfly valves subjected to high pressure (e.g. U.S. Patent 2,083,154) the butterfly wicket engages the valve housing in metal to metal contact when the valve is closed. The wicket is provided with a metallic packing ring movably carried in its edge. The packing ring is divided into two C-shaped parts by the shaft that rotatably supports the wicket. The parts of the packing ring are made movable so they can be adjusted to tightly engage a seat provided in the housing. Metal to metal engagement is used because a resilient member would deform and leak at high pressures.

This type of valve presents distinct problems that must be solved to stop leakage past the shaft.

(1) When the packing ring is adjusted to tightly engage the seat in the housing, the ends of each C-shaped part move. It is difficult to prevent leakage through the space between the ends of the packing ring and the shaft because the space varies with adjustment.

(2) The end of the packing ring also moves relative to an end corner of the housing seat when the ring is adjusted. It is difficult to prevent leakage caused by this movement.

(3) The space between the housing seat and the shaft must be closed.

(4) The space between the shaft, and the shaft opening in the housing through which the shaft passes, must also be closed.

One of the reasons that it has been so difficult to prevent leakage through a high pressure valve is that it has not been practical to use a resilient annular member or seal as part of the sealing arrangement around the shaft. The advantage in using a resilient seal is the seal's characteristic of flowing under pressure and filling the space in which it is confined.

It is impractical to use a resilient seal in a high pressure valve because the resilient seal leaks and wears out quickly in this environment. The reason for this is that the configuration of the shaft opening and the seal are such that not all of the seal can be completely confined within the shaft opening in the housing. Some of the seal extends out of the shaft opening toward the interior of the valve.

The portions of the seal that extend out of the shaft opening and are not confined bulge when the seal is compressed axially. Bulging decreases the effectiveness of the seal because the pressure used to compress the seal must be limited. If the pressure used to compress the seal is not limited, it can blow out the confined portion of the seal that is on the downstream side of the wicket.

As a result, the seal does not expand against the surfaces it is sealing with the force with which it is capable. Therefore, the higher the press the valve is subjected to, the more likely it is to leak.

In addition, prior art seals even though held stationary twist with the shaft when the shaft turns. The bulging portions rub against the edge of the housing and wear out. For the above reasons it has not been practical to use a resilient seal in a high pressure valve.

My invention provides a sealing arrangement that:

(1) permits high pressures to be employed,
(2) leaks less than conventional sealing arrangements,
(3) wears longer than conventional sealing arrangements, and
(4) permits use of a resilient seal.

Essentially, my invention consists in providing a sealing arrangement that includes a resilient annular seal containing a rigid portion in its matrix, a retaining ring, and a pair of resilient block members. The retaining ring and block members cooperate with the seal and valve seat to prevent leakage around the shaft.

It is known to provide a reinforcing member in the matrix of a seal (e.g. U.S. Patents 2,697,623 and 2,145,-598). However, to my knowledge, no one has ever used a reinforcing member in a resilient matrix to prevent expansion of selected surface areas of the matrix of a seal.

It is an object of my invention to provide a sealing arrangement that permits use of higher pressures in valves.

It is another object of my invention to provide a sealing arrangement that wears longer than conventional sealing arrangements.

It is another object of my invention to provide a sealing arrangement that leaks less than conventional sealing arrangements.

It is another object of my invention to provide a sealing arrangement that permits use of a resilient seal.

Other objects and advantages will appear from the following description considered in conjunction with the attached drawings, in which.

Figure 1:
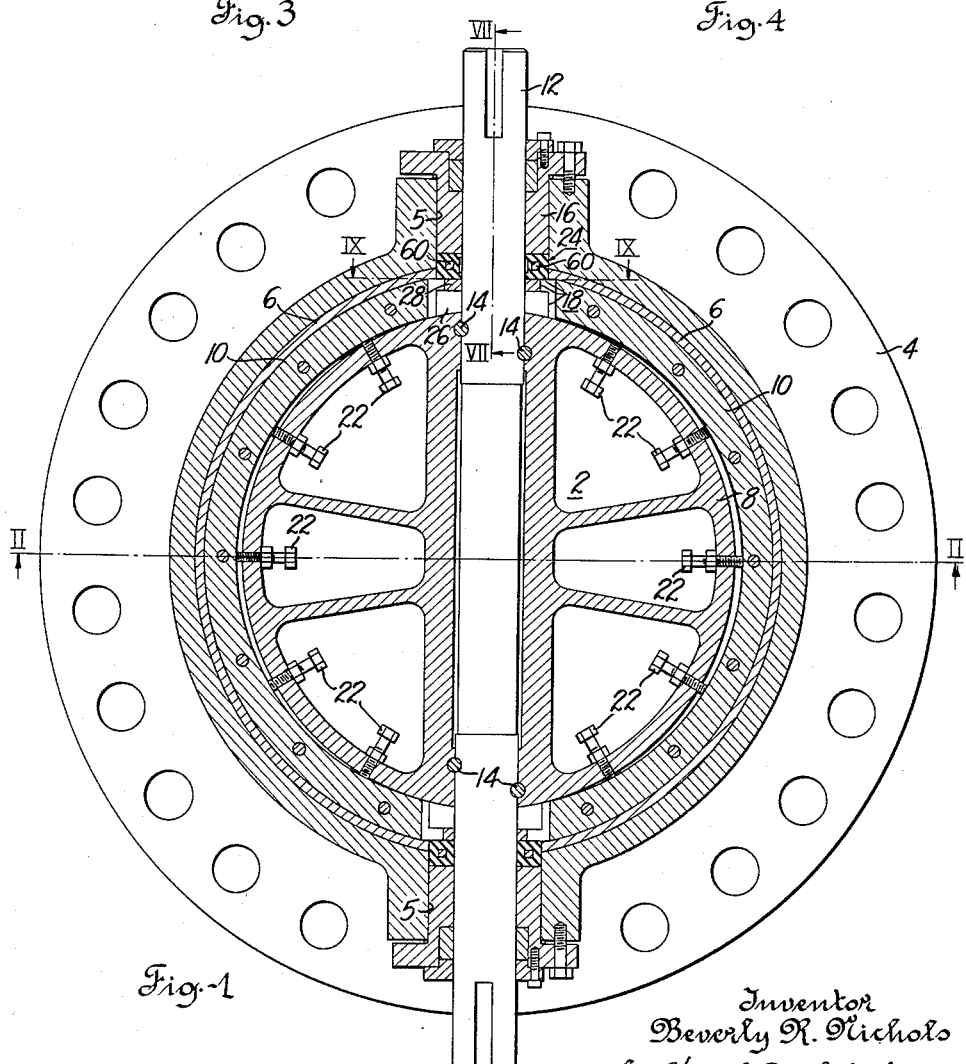
Fig. 1 is a view of a butterfly valve with the wicket in closed position.
Figure 2:
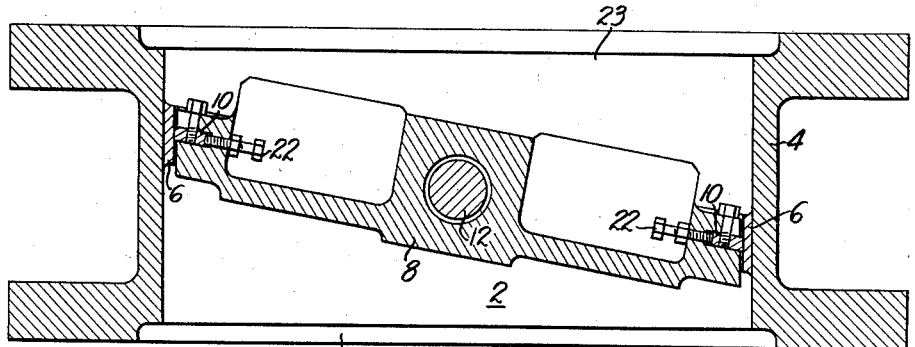
Fig. 2 is a sectional view of Fig. 1 taken in the direction of arrows II—II, showing the internal ridge of the housing of a high pressure valve.

Referring generally to Figs. 1 and 2, there is disclosed a high pressure butterfly valve 2 comprising: valve housing 4, including shaft opening 5 and seat 6; wicket 8, containing a movable packing ring 10 comprising two C-shaped parts which engage seat 6 when the valve is closed; shaft 12, fixed to wicket 8 by keys 14, and rotatable in shaft opening 5 to open and close the valve; bearing sleeve 16; and sealing arrangement 18, between sleeve 16 and wicket 8, that prevents leakage around valve shaft 12.

Wicket 8 carries screws 22 that move packing ring 10 either radially toward or from seat 6 on housing 4 for a tight fit. Although seat 6 is disclosed as raised, it is obvious seat 6 can be in the plane of the housing surface, or even recessed.

Referring to Fig. 2 the valve is opened by rotating shaft 12 clockwise and closed by rotating the shaft counterclockwise. The upstream side of the valve is indicated by numeral 21 and the downstream side by numeral 23.

My sealing arrangement 18 (Fig. 5), that prevents leakage around the valve shaft, comprises: an annular seal 24; a pair of resilient blocks 26, 26, which may be rubber; and a retaining ring 28, which may be brass.

Figure 7:
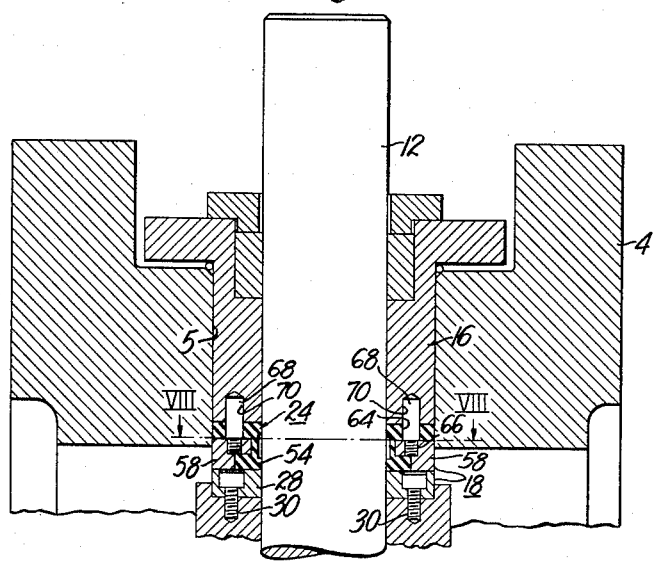
Fig. 7 is a sectional view of Fig. 1 taken in the direction of arrows VII—VII, illustrating the position of the reinforcing member and how it prevents bulging.

Blocks 26 and retaining ring 28 rotate with wicket 8 relative to seal 24. Retaining ring 28 is connected to the wicket by screws 30 (Fig. 7). Seal 24 is interconnected with the housing and is maintained stationary.

Resilient blocks 26 (Figs. 5 and 6) prevent leakage, through the space between shaft 12 and packing ring 10 carried by the wicket, and also between wicket 8 (Fig. 5), seal 24 and end corner 25 of seat 6. End corner 25 of seat 6 has been extremely difficult to seal. This is because packing ring 10 moves relative to corner 25 making the size of the space vary with adjustment.

Figure 9:
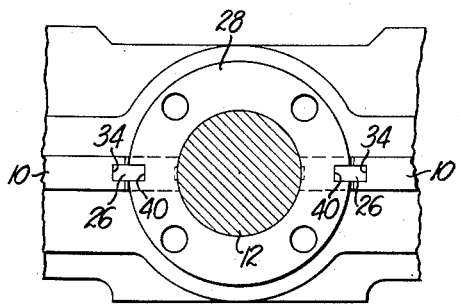
Fig. 9 is a sectional view of Fig. 1 taken in the direction of arrows IX—IX, showing the metal packing ring and resilient blocks of the sealing arrangement.
Figure 5:
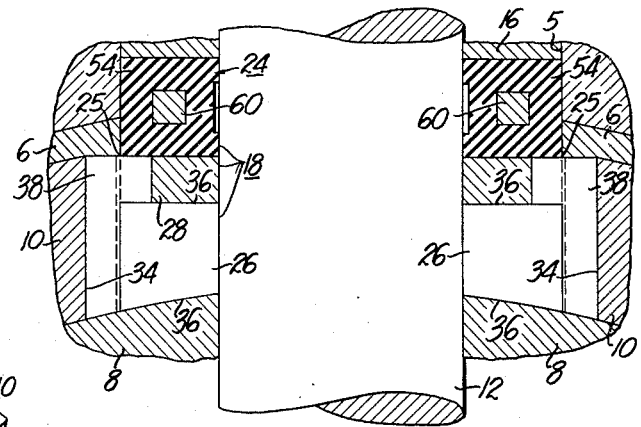
Fig. 5 is an enlarged view of Fig. 1 showing a section of my new seal.
Figure 6:
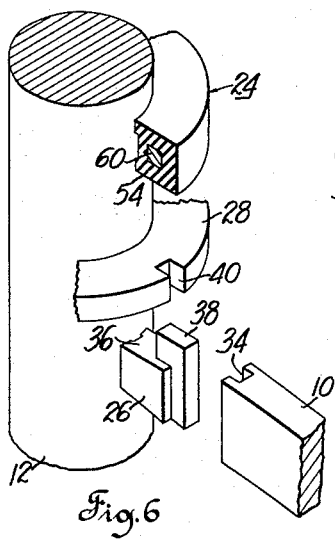
Fig. 6 is a perspective exploded view of Fig. 5 illustrating assembly of various parts of the sealing arrangement.

Resilient blocks 26 (Fig. 9) are received in grooves 34 in the ends of packing ring 10 (Figs. 5, 6 and 9). Each resilient block is made large (Fig. 5) and is compressed against shaft 12 by packing ring 10. The top and bottom 36, 36 of each resilient block is also compressed between wicket 8 and retaining ring 28.

When packing ring 10 is moved by screws 22, the ends of the packing ring move toward or from shaft 12. Blocks 26, 26 will expand, or be compressed by the ends of packing ring 10. The block will thus follow movement of the ends of the packing ring. This provides a tight seal between packing ring 10 and shaft 12.

Each resilient block 26 (Figs. 5 and 6) is provided with a projection 38 which extends upwardly through a groove 40 (Figs. 6 and 9) in each side of retaining ring 28.

Each block 26 (Fig. 5) is compressed between wicket 8, shaft 12, packing ring 10, and retaining ring 28. Projections 38 are extruded upwardly through grooves 40 against the matrix of the seal and seat 6. The projections are designed to extend about .015" above the relating ring and tightly engage seal 24 and corner 25 of seat 6 closing off the space below the seal and seat.

How a resilient seal operates in the sealing arrangement and what happens when a seal is compressed, can more easily be explained with reference to Figs. 3 and 4. These are illustrations of a conventional seal in a low pressure valve.

Figure 3:
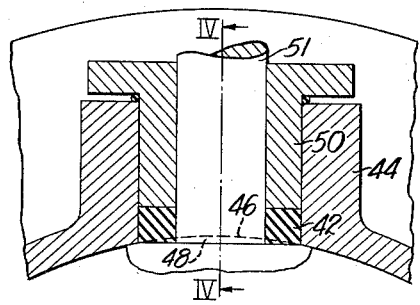
Fig. 3 is a view of a conventional seal as it appears in a low pressure valve.

At first glance seal 42 in Fig. 3 appears completely confined within housing 44. However, it can be seen that, due to the curvature of the housing (dotted line 46), portions 48 of the seal extend out of housing 44. These unconfined portions 48 are shown in Fig. 4.

When bearing sleeve 50 applies axial pressure on seal 42, unconfined portions 48 bulge outwardly. It is these bulging portions that limit the pressure that can be applied. When shaft 51 rotates, prior art seal 42 will twist with the shaft rubbing bulging portions 48 against edges 52 of the housing, wearing these portions of the seal out.

These disadvantages are even more serious when the housing contains a raised seat 6. Even more of the outer surface of the seal is exposed because the seal must extend to the top surface of seat 6 to prevent leakage. See Fig. 10 for an illustration of my seal with a raised seat 6 in a high pressure housing.

Figure 8:
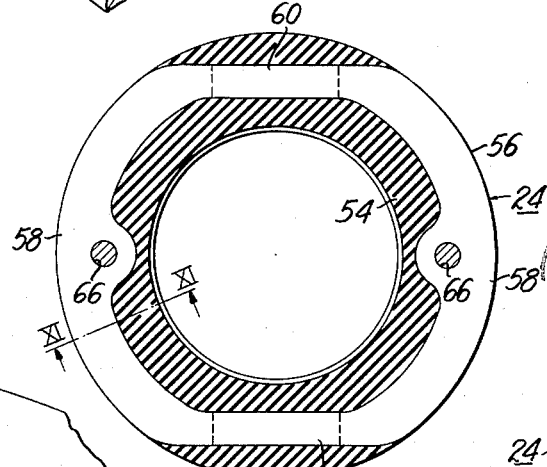
Fig. 8 is a sectional view of Fig. 7 taken in the direction of arrows VIII—VIII, illustrating a plan view of the reinforcing member in the matrix of the seal.
Figure 10:
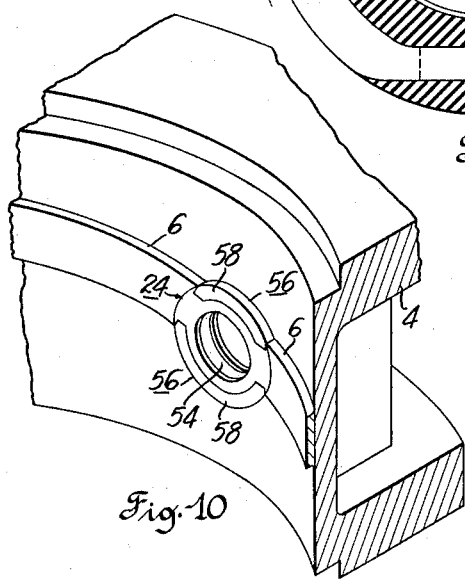
Fig. 10 is a perspective view illustrating how my new seal cooperates with the metallic ridge of the housing of a high pressure valve.

My seal 24, referring to Figs. 7, 8 and 10, comprises a resilient matrix 54 which supports a reinforcing member 56.

Reinforcing member 56 is generally oval (Fig. 8) and comprises two outer opposed sections 58, 58 and two inner connecting sections 60, 60.

The reinforcing member may be metallic or some other rigid material that will prevent expansion of matrix 54. Outer opposed sections 58, 58 are embedded in portions of the outer surface of matrix 54 (see Figs. 7, 8 and 10). Connecting sections 60, 60 of reinforcing member 56 are buried in said matrix (see Figs. 5 and 8) and interconnect outer opposed sections 58, 58.

Figure 11:
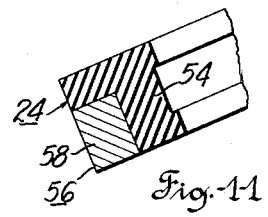
Fig. 11 is a section of Fig. 8 taken in the direction of arrows XI—XI.

The cross section of reinforcing member 56 is non-uniform. That is, connecting sections 60, 60 have a square cross section (Fig. 5), while opposed outer sections 58, 58 are of substantially rectangular cross sections (Fig. 11).

Reinforcing member 56, due to its position in matrix 54, controls the direction of flow of said resilient matrix.

Figure 4:
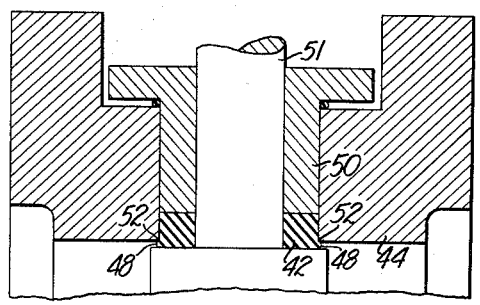
Fig. 4 is a sectional view of Fig. 3 taken in the direction of arrows IV—IV showing the bulging portions of the seal.

As can be seen in comparing Figs. 4 and 7, outer section 58 of reinforcing member 56 prevents expansion of what corresponds to portion 48 of the prior art seal.

It is noted that outer opposed sections 58, 58 of reinforcing member 56 (see Figs. 7 and 11) do not extend from the bottom to the top surface of the matrix. There is a portion of matrix 54 above reinforcing member 56 that is confined within housing 4. This portion expands and provides a tight seal in the space above the reinforcing member, thus preventing leakage through shaft opening 5 of the housing.

Any locking means can be provided to prevent seal 24 from rotating with shaft 12. In the embodiment illustrated, the seal is keyed to sleeve 16 which is in turn fixed to housing 4. Openings 64 (Fig. 7) are provided in resilient matrix 54, and threaded bores 66 (Figs. 7 and 8) are provided in reinforcing member 56. Threaded pins 68 (Fig. 7) are inserted through openings 64 in the matrix and threaded into the threaded bores 66 in the reinforcing member. The other ends of the pins are received in openings 70 in the compressing sleeve. The sleeve is in turn fixed to the valve housing so the sleeve cannot rotate.

Referring to Fig. 10, the seal is shown assembled in a valve housing having a raised seat 6. Outer opposed sections 58, 58 of the reinforcing member cover the unconfined portions of the matrix. These portions of the matrix are prevented from expanding under pressure. Sections 58, 58 direct the pressure to areas of the matrix which can expand and these portions intimately engage the housing and its seat.

It is noted that when the valve is opened or closed there will be very little rubbing of one resilient part on another resilient part. A resilient part will slide along a metal part. Retaining ring 28 is metallic and will slide along the matrix of the seal. Projections 38 of the blocks abut the matrix of the seal and seat 6 (Fig. 5), when the valve is closed. However, when the wicket is turned, the projections move onto metallic portions 58, 58 (Fig. 10) and slide along the metallic portions 56. The above arrangement decreases friction and wear.

In summary:

When the valve is closed (Figs. 1 and 2), seal 24 (Fig. 5), retaining ring 28, and blocks 26 cooperate to seal shaft 12. Leakage from one side of the valve, to the other side of the valve around the shaft, as well as out the shaft opening in the housing, is prevented.

The space where leakage can occur is completely filled by resilient material that can expand or contract and compensate for any movement. Matrix 54 of the seal fills the space bounded by sleeve 16, shaft 12, housing 4, retaining ring 28, seat 6, and opposed portions 58 of reinforcing member 56. Each resilient block 26 fills the space bounded by seal 24, seat corner 25, retaining ring 28, shaft 12, wicket 8, and packing ring 10.

When shaft 12 rotates to open or close the valve, wicket 8, packing ring 10, resilient blocks 26, and retaining ring 28, rotate relative to the seal 24.

Since the matrix of seal 24 is confined all around, it can no longer bulge. Therefore, as much pressure as desired can be applied to the matrix. This forces the matrix into intimate contact with the surfaces it is sealing.

Additionally, since the matrix no longer bulges (see Fig. 7), even if it did twist with the shaft when the shaft turns, it cannot wear against the edge of the housing.

As mentioned before, the advantages of my sealing arrangement are: (1) longer life, (2) less leakage, and (3) higher pressures can be used.

Although but a single embodiment of the invention has been illustrated and described, it will be apparent to one skilled in the art that various changes and modifications may be made therein without departing from the spirit of the invention or from the scope of the appended claims.

What is claimed is:

1. In a sealing arrangement for a shaft that is supported for rotation by a housing, a seal comprising: a resilient annular matrix encircling said shaft and said matrix having an outer peripheral surface, said matrix having a portion of its outer peripheral surface confined and a different portion of its outer peripheral surface unconfined; and a reinforcing member carried by said matrix, said reinforcing member including an outer section embedded in and covering said outer peripheral surface of said unconfined portion of said matrix to prevent expansion radially outward from said shaft of said unconfined portion of said matrix when said matrix is subjected to pressure.

2. In a sealing arrangement for a shaft that is supported for rotation by a housing, a seal comprising: a resilient annular matrix encircling said shaft, said matrix having a portion of its surface confined and a different portion of its surface unconfined; and a reinforcing member including outer sections embedded in and covering said surface of said unconfined portion of said matrix, and connection sections interconnecting said outer sections to prevent relative movement between said outer sections, said outer sections preventing expansion of said unconfined portion when said matrix is subjected to pressure.

3. In a sealing arrangement for a shaft that is supported for rotation by a housing, a seal comprising: a resilient annular matrix encircling said shaft, said matrix having a portion of its surface confined and a different portion of its surface unconfined; and a reinforcing member including two opposed outer sections embedded in and covering said surface of said unconfined portion of said matrix and two connecting sections interconnecting said outer opposed sections, said connection sections being buried in said matrix so said confined portion of said matrix between said opposed outer sections can expand when pressure is applied to said matrix while said outer sections prevent said unconfined portion from expanding.

4. In a sealing arrangement for a shaft that is supported for rotation by a housing, a seal comprising: a resilient annular matrix encircling said shaft, said matrix having a portion of its surface confined and a different portion of its surface unconfined; and a reinforcing member of oval shape positioned in said matrix, the outer sections of said oval embedded in and covering the surface of said unconfined portion of said matrix, the connecting portions of said oval buried in said confined portion of said matrix so said confined portion of said matrix can expand when pressure is applied to said matrix, said outer sections preventing expansion of said unconfined portion of said matrix when said matrix is subjected to pressure.

5. A device as set forth in claim 4 wherein said annular matrix is cylindrical, and said outer portions of said reinforcing member are of rectangular cross section and are carried in the outside edge of said annular cylindrical matrix.

6. A sealing arrangement for the shaft of a butterfly valve, said valve including a housing with a seat, said shaft carrying a wicket, said wicket containing a packing ring in its edge for engaging said seat, and said packing ring having grooved ends, said sealing arrangement comprising: a seal encircling said shaft; a pair of resilient blocks, an individual block received in each grooved end of said packing ring, each resilient block being compressed against said shaft by said packing ring; and an annular retaining ring positioned between and engaging said seal and said blocks, said retaining ring containing an individual opening for each block, each of said resilient blocks including a projection that extends through said individual opening provided in said retaining ring, each of said projections engaging against said seal and said housing seat.

7. A sealing arrangement for the shaft of a butterfly valve, said valve including a housing with a seat, said shaft carrying a wicket, said wicket containing a packing ring in its edge for engaging said seat, and said packing ring having grooved ends, said sealing arrangement comprising: a seal encircling said shaft and including a resilient annular matrix that has a portion of its surface confined by said housing and a portion of its surface that extends out of and is unconfined by said housing, and a reinforcing member carried by said matrix, said reinforcing member covering said unconfined surface portion and preventing said unconfined surface portion from expanding under pressure; a pair of resilient blocks, an individual block received in each grooved end of said packing ring, each resilient block being compressed against said shaft by said packing ring; and an annular retaining ring positioned between and engaging said seal and said blocks, said retaining ring containing an individual opening for each block, each of said resilient blocks having a projection that extends through said individual opening provided in said retaining ring, each of said projections engaging against said seal and said housing seat.

8. A sealing arrangement for the shaft of a butterfly valve, said valve including a housing with a seat, said shaft carrying a wicket, said wicket containing a packing ring in its edge for engaging said seat, and said packing ring having grooved ends, said sealing arrangement comprising: a seal encircling said shaft and including a resilient annular matrix that has a portion of its surface confined by said housing and a portion of its surface that extends out of and is unconfined by said housing, and a reinforcing member carried by said matrix, said reinforcing member including outer sections interconnected by a connecting section, said outer sections embedded in and covering said surface of said unconfined portion of said matrix, said connecting section buried in said confined portion of said matrix so said confined portion of said matrix can expand when pressure is applied to said matrix, while said outer sections prevent said unconfined portion of said matrix from expanding when said matrix is subjected to pressure; a pair of resilient blocks, an individual block received in each grooved end of said packing ring, each resilient block being compressed against said shaft by said packing ring; and an annular retaining ring positioned between and engaging said seal and said blocks, said retaining ring containing an individual opening for each block, each of said resilient blocks having a projection that extends through said individual opening provided in said retaining ring, each of said projections engaging against said seal and said housing seat.

9. A sealing arrangement for the shaft of a butterfly valve, said valve including a housing with a seat, said shaft carrying a wicket, said wicket containing a packing ring in its edge for engaging said seat, and said packing ring having grooved ends, said sealing arrangement comprising: a seal including a resilient annular matrix that has a portion of its surface confined by said housing and a portion of its surface that extends out of and is unconfined by said housing, and a reinforcing member of oval shape carried by said matrix, the outer sections of said oval being embedded in and covering the surface of said unconfined portion of said matrix, the connecting portions of said oval being buried in said confined portion of said matrix so said confined portion of said matrix can expand when pressure is applied to said matrix, while said outer sections of said oval prevent said unconfined portion of said matrix from expanding when said matrix is subjected to pressure; a pair of resilient blocks, an individual block received in each grooved end of said packing ring, each resilient block being compressed against said shaft by said packing ring; and an annular retaining ring positioned between and engaging said seal and said blocks, said retaining ring containing an individual openng for each block, each of said resilient blocks having a projection that extends through said individual opening provided in said retaining ring, each of said projections engaging against said seal and said housing seat.

10. In a sealing arrangement for the shaft of a butterfly valve, said valve including a housing with a seat, said shaft carrying a wicket, said wicket containing an adjustable packing ring in its edge for engaging said seat, said packing ring having grooved ends, and a resilient annular seal encircling said shaft, an arrangement for compensating for movement of said ends of said adjustable packing ring comprising: a pair of resilient blocks, an individual block received in each grooved end of said packing ring, each resilient block being compressed against said shaft by said packing ring; and an annular retaining ring positioned between and engaging said seal and said blocks, said retaining ring containing an individual opening for each block, each of said resilient blocks having a projection that extends through said individual opening provided in said retaining ring, each of said projections engaging against said seal and said housing seat.

References Cited in the file of this patent

UNITED STATES PATENTS

| | | |
|---|---|---|
| 1,858,587 | Grant | May 17, 1932 |
| 2,022,395 | White et al. | Nov. 26, 1935 |
| 2,480,116 | Brummer | Aug. 30, 1949 |